Figure 1:
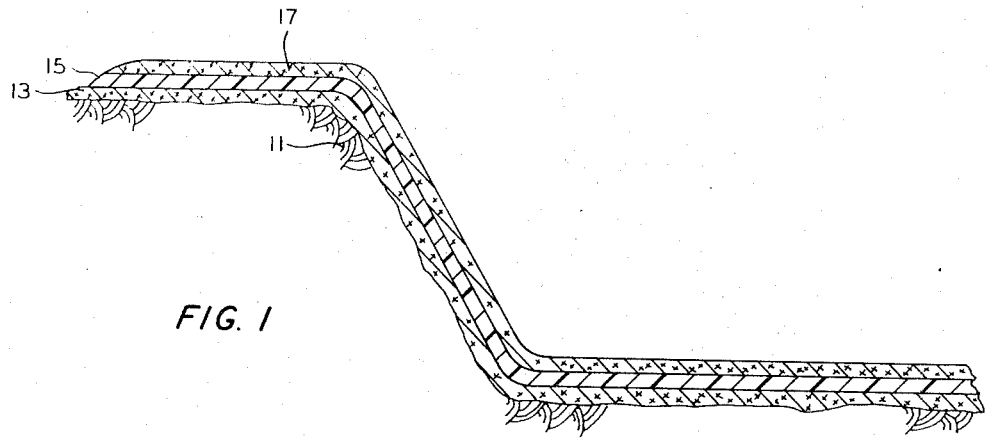

United States Patent [19]

Ramsay

[11] 3,869,417

[45] Mar. 4, 1975

[54] MODIFICATION OF ASPHALT WITH ETHYLENE-VINYL ACETATE COPOLYMERS TO IMPROVE PROPERTIES

[75] Inventor: Ray D. Ramsay, Bartlesville, Okla.

[73] Assignee: Phillips Petroleum Company, Bartlesville, Okla.

[22] Filed: Feb. 16, 1971

[21] Appl. No.: 115,538

[52] U.S. Cl. ............ 260/28.5 AS, 161/236, 161/254
[51] Int. Cl. ............................................. C08f 45/52
[58] Field of Search ............................ 260/28.5 AS

[56] References Cited
UNITED STATES PATENTS

| | | | |
|---|---|---|---|
| 3,144,423 | 8/1964 | Belak | 260/28.5 AS |
| 3,249,567 | 5/1966 | Vigneault | 260/28.5 AS |
| 3,309,329 | 3/1967 | Schultz | 260/28.5 AV |
| 3,395,110 | 7/1968 | Crady | 260/28.5 AS |
| 3,442,841 | 5/1969 | Adelman | 260/28.5 AS |
| 3,505,260 | 4/1970 | Woodruff | 260/28.5 AS |

*Primary Examiner*—Morris Liebman
*Assistant Examiner*—Paul R. Michl

[57] ABSTRACT

Asphalt is modified by blending with ethylene vinyl acetate copolymer and, optionally, low density polyethylene and/or wax to provide coating compositions particularly useful in forming laminates, adhesives, pond liners and the like.

7 Claims, 5 Drawing Figures

PATENTED MAR 4 1975  3,869,417

INVENTOR.
R. D. RAMSAY

BY

ATTORNEYS

MODIFICATION OF ASPHALT WITH ETHYLENE-VINYL ACETATE COPOLYMERS TO IMPROVE PROPERTIES

This invention relates to asphalt compositions. More particularly, the invention relates to modified asphalt compositions particularly useful as coating and adhesive materials.

Asphaltic compositions have been widely used as paving materials, hot melt adhesives, coating compositions, laminates and the like. Generally, the performance characteristics of asphalt compositions have been modified by the addition of various additives in order to tailor the asphaltic material to better suit the particular end use. An increasing use of such asphaltic material has been in pond liner applications for the storage of water and/or waste materials. Among other requirements, pond liners must be completely impervious to a fluid pressure of 30 psi at 150° F. While such compositions have proven to be quite effective in the storage of liquid materials, they have been susceptible to breakdown of the asphaltic materials, particularly at greater depths of liquid. The present invention provides an asphaltic cement material particularly suited for use in the formation of pond liners, which exhibits greater resistance to breakdown occasioned by high hydrostatic head. Such compositions are provided by certain hereinafter-described homogeneous blends of an asphaltic material and certain polymeric additives.

The asphalt which can be used in the practice of the invention covers a wide range of materials, including either natural asphalts or residues from the distillation of petroleum. Suitable asphalts are those derived from petroleum refining operations such as vacuum distillation, solvent extraction, i.e., propane deasphalting, and oxidation processes or combinations of these. Particularly preferred asphaltic materials are the air-blown asphalts and catalyzed air-blown asphalts employing such catalysts as phosphorus pentoxide and zinc chloride. The above list is not exhaustive and other types of high softening asphalts comparable to the above-named materials known in the art can be used. These asphalts can be characterized by a penetration value (ASTM D-549) in the range of about 100–150 (before blowing), and preferentially in the range of 115–135. The air-blown asphalts which are preferred for use in the practice of the invention will have a penetration after blowing in the range of 25–40, particularly about 35, and will exhibit a ring and ball softening point in the range of about 150° F. to 185° F. with a particularly preferred value of 165° F.

The polymeric modifiers which are used in the practice of the invention are selected from the class consisting of copolymers of ethylene and vinyl acetate. Such copolymers are characterized by a melt index in g/10 min. (ASTM D-1238, modified) in the range of 1.6–580, with a vinyl acetate content in the range of 17 to 42 percent. Such copolymers are further characterized by a density in grams per cc, of about 0.93 to 0.97, a bulk density in pounds per cubic foot in the range of about 30 to about 35, an elastic modulus of about 320 psi to about 3500 psi, a Shore A-2 hardness in the range of 35 to 88, and a ring and ball softening point in the range of 180° F. to 390° F. Particularly preferred are blends, preferentially in equal weight amounts, of one such copolymer having a vinyl acetate content in the range of 32 to 34 percent and a melt index in the range of about 22 to 28 and a ring and ball softening point of about 240° F. in combination with another such copolymer having a melt index in the range of about 2.1 to 2.9, a vinyl acetate content in the range of 17 to 19 percent and a ring and ball softening point of about 390° F.

The blends of this invention comprise a homogeneous dispersion of polymeric additive in asphaltic material. The blends can be used hot, cut back with lighter hydrocarbons (as cut-back asphalts are used) or as aqueous emulsions. The compositions of our invention can be used in a conventional manner such as by spraying, brushing, precoating, e.g., dipping, or the like.

In forming the blends of the invention, from about 50 to about 99, preferentially 80 to 99, weight percent of the selected asphalt is homogeneously blended with from about 1 to about 50, preferentially 1 to 20, weight percent of at least one copolymeric additive. When blends of two or more ethylene-vinyl acetate copolymers are used to modify asphalt according to the invention, the amount of each copolymer will be in the range of about 1 to 49, preferentially 1 to 19, and particularly 5 to 15, weight percent, with the total amount of such copolymer blends being within the previously listed limits. Throughout the specification, the relative amounts of asphalt and polymeric additive are based on the total weight of asphalt and polymeric additive present in the blends. Particularly beneficial results have been obtained by the use of about 10 weight percent of polymeric additive. Especially desired are blends comprising a mixture of at least two polymeric additives in equal weight amounts.

Other additives such as mineral aggregate, sand and the like can be added to the modified asphalt blends of the invention. The addition of asbestos to the blends of this invention in amounts ranging from 0.5 to about 10, preferably 2.5 to 5, weight percent has been found particularly beneficial in some applications. In addition, the physical properties of the copolymer-modified asphalt blends of this invention can be further modified by the addition of polyolefinic materials and waxes.

According to the present invention, there is provided a laminate system comprising a polyolefin fabric impregnated with an asphalt-like material which is particularly useful as a liner for a pond or storage pit, as a covering for surfaces on the ground, as a roadway construction material or the like. The laminates of the invention can be built a priori, transported to the site of use and then installed or can be built at the site of use. Thus, according to the invention, it has been found that a polyolefin fabric is combinable with the asphaltic materials of this invention to produce an overlay or lining or cover having highly advantageous fluid or liquid sealing properties.

The polyolefin fabrics which can be used in the practice of the invention include any nonwoven polyolefin fabric formed from the fibers of a polymer or copolymer of α-olefins having from 2 to 8 carbon atoms. The preparation of such polymeric materials and the forming of fibers therefrom can be according to conventional means and is not essential to the invention. The preferred polyolefin fabrics for use in the practice of the invention are those formed from polyolefinic materials made according to a process of Hogan et al U.S. Pat. No. 2,825,721. A presently preferred fabric is a polypropylene fabric such as "Petromat" (a trademark).

"Petromat" is a nonwoven fabric of polypropylene fibers and is available from Phillips Petroleum Company, Chemical Department, Bartlesville, Oklahoma. "Petromat" is available in rolls of about 6 to 15 feet width and lengths of about 200 to 3000 lineal feet. "Petromat" has a weight of about 4 to 6 ounces per square yard, a tensile strength in the warp direction of 80 to 90 pounds and a tensile strength in the fill or woof direction of about 90 to 100 pounds.

In preparing the laminate structure according to the invention for use as a pond lining, the modified asphalt blends of the invention are applied to the nonwoven polyolefin fabric by impregnation, painting, spraying, or any other manner in which such materials are ordinarily applied. As noted, the laminates can be made up in the shop and transported to the site of use. Preferably, the pond linings of the invention are produced by laying the nonwoven polyolefin fiber on the prepared pond surface. Seams can be overlapped and joined together by use of a hot melt adhesive such as one based on the modified asphalt blends of this invention by addition thereto of an appropriate wax; or the seams can be joined by sewing, which is the preferred method of joining sections of a polyolefin nonwoven fabric. Preferably, the modified asphalt blends of this invention are sprayed onto the nonwoven polyolefin fabric in an amount in the range of 0.1 to 1 gallon per square yard, preferably 0.4–0.6 gallon per square yard. In a particularly desired embodiment, the modified asphalt blends are sprayed onto the nonwoven polyolefin fabric in an amount in the range of about 0.5 gallon per square yard. The blend is heated to about 250° to 300° F. for spraying to obtain proper application. Preferably, 24 to 48 hours of atmospheric aging is allowed after spraying before the pond is used. If desired, fine aggregate, talc, or the like can be applied to at least the top surface of the product.

The modified asphalt compositions of this invention have been found to be particularly useful in forming pond liners. Such liners prepared according to the invention exhibit excellent flexibility and are impervious at a fluid pressure of 30 psi at 150° F. When modified, these compositions, with or without further modification by addition thereto of polyolefins or waxes, can be used for roofing, crack filling or expansion joints in concrete work, as solvent-resistant coatings such as for service station driveways, and the like.

Laminates prepared according to the invention when applied to an appropriate substrate are especially useful for the storage of chemicals, brine, or liquid fertilizers, and can be used to line pits, ditches, tanks, ponds, etc., especially where contamination of the ground is to be avoided. Further, compositions prepared according to the invention can be applied to landing strips, used for built-up roofing, and for a large variety of other uses.

FIG. 1 illustrates the invention as applied to an earthen pit in which there is shown a seepage barrier using an ionic asphalt emulsion ground treatment, strips of nonwoven plastic, and a modified blend of the invention thereover.

Figure 2:
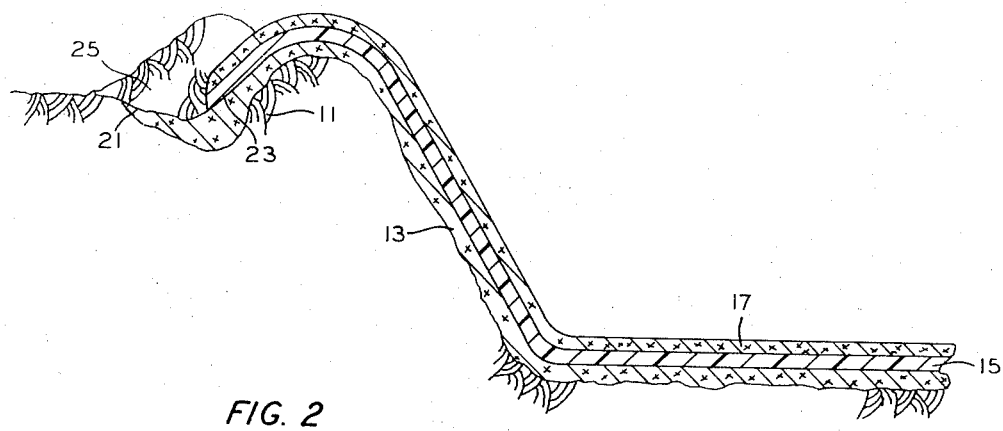

FIG. 2 of the drawing illustrates a preferred method for anchoring the outer edge of the laminates of this invention when used as a pit liner.

Figure 3:
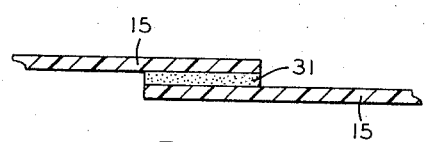

FIG. 3 of the drawing illustrates a method for joining strips of nonwoven fiber using a hot melt adhesive binder. In this embodiment, a 50 percent overlap is preferably used. Generally, the binder for overlapping in accordance with FIG. 3 can comprise the modified asphalt compositions of this invention, with or without further modification by the addition thereto of polyolefins or waxes.

Figure 4:
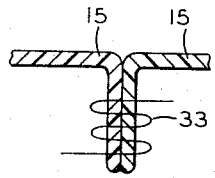
Figure 4A:
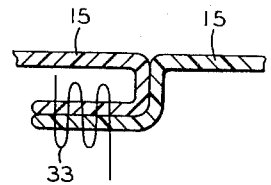

FIGS. 4 and 4A illustrate the preferred joining of sections of polyolefin fabric by sewing (FIG. 4) with a seam preferentially lapped over as in FIG. 4A.

Referring to the drawing in more detail, in FIG. 1 the number 11 represents a relatively smooth earthen surface which has been formed in the shape of a reservoir in the earth, and tamped on the floor and sides thereof. If desired, an asphaltic material, preferably an anionic or nonionic asphalt emulsion 13 is applied to the tamped earthen surface 11 to penetrate the surface in order to consolidate this surface. Upon 11 or 13 is placed a nonwoven mat 15 of plastic material, e.g., "Petromat", preferably applied in overlapping strips with the seams joined by sewing. The mat 15 is preferably applied before the asphaltic material 13, when used, has "set" so that the mat 15 will adhere firmly to the asphaltic substrate. A layer 17 of the modified asphalt blends of the invention, preferably a hot homogeneous blend, is applied to the nonwoven mat 15. More than one layer of nonwoven mat may be used, e.g., a second layer of mat 15 can be placed over coating 17 and a final coating of modified asphalt of the invention can be applied thereover (not shown).

The periphery of the pond liner structure of FIG. 1 is preferably buried in the trench 21 as shown in FIG. 2, to anchor the structure against slippage and to prevent undercutting from rainfall or dislodging of the liner due to flooding. Trench 21 can be, e.g., from about 10 inches to about 18 inches in depth, preferably about 12 inches to 15 inches. The inside wall 23 of trench 21 preferably has a slope such that it makes an angle from about 30° to about 60°, preferably about 45°, with the vertical. The trench 21 is preferably backfilled with dirt 25 that is free of large stones and is compacted firmly. The construction provides a retaining force acting on the liner to prevent its removal from the reservoir.

As noted, FIG. 3 is representative of a method for joining strips of nonwoven plastic material 15 using a hot melt adhesive 31 to join the strips together. FIGS. 4 and 4A represent a preferred method of joining the nonwoven material 15 by overlapping the ends and joining the seam by sewing with thread 33.

The invention will be readily understood by referring to the following illustrative examples:

EXAMPLE I

Air-blown asphalt was produced by conventional air oxidation (noncatalytic) of a vacuum-reduced topped crude produced from Western Kansas crude oil. The 77° F., 5-second, 100-gram penetration of the vacuum-reduced crude, prior to air blowing, was in the range of 100 to 150 and specifically 120. After air blowing, the penetration was 25 to 40, specifically 35, and the ring and ball softening point was in the range of 150° F. to 185° F., specifically 165° F.

To 90 parts by weight of the above-described air-blown asphalt were added equal weight amounts, i.e., 5 parts by weight of each of two ethylene-vinyl acetate copolymers. One of said copolymers exhibited a vinyl acetate content in the range of 32–34 weight percent, a melt index of 22–28, and a ring and ball softening point of 240° F. The second of the ethylene-vinyl acetate copolymers exhibited a vinyl acetate content in the range of 17–19 weight percent, a melt index in the range of 2.1–2.9, and a ring and ball softening point of about 390° F.

The asphalt was blended with the ethylene-vinyl acetate copolymer granules at a temperature in the range of 350° to 400° F. to obtain a homogeneous blend.

A liner for a salt water disposal pond was prepared using the above blend by laying a matting of nonwoven polypropylene fabric over the previously prepared pond area, with the seams of the polypropylene fabric joined by sewing. The above-described blend was sprayed onto the nonwoven fabric in an amount of about 0.5 gallon per square yard. The blend was heated to about 250° to 300° F. for spraying to obtain proper application. Forty-eight hours of atmospheric aging was allowed before the pond was used. The pond liner remained substantially impervious to fluid loss during an extended test period.

EXAMPLE II

The air-blown asphalt of the preceding example was used to provide several aliquot portions. Certain of the portions were modified according to the present invention, and one portion was unmodified for control purposes. The effect of the additives of the invention upon the penetration and softening point of the asphaltic materials is shown in the accompanying table.

TABLE

| Blend | Asphalt | Additive EVA-1 Parts by Weight | EVA-2 | Asbestos | Penetration 77°F. | 39.2°F. | Ring & Ball Softening Point |
|---|---|---|---|---|---|---|---|
| Control | 100 | — | — | — | 30 | 35 | 165°F. |
| 1 | 95 | 5 | — | — | 28 | 35 | 220°F. |
| 2 | 95 | — | 5 | — | 41 | 41 | 192°F. |
| 3 | 95 | — | — | 5 | 28 | 32 | 210°F. |
| 4 | 90 | 5 | — | 5 | 23 | 28 | 264°F. |
| 5 | 90 | — | 5 | 5 | 22 | 27 | 275°F. |
| 6 | 90 | 5 | 5 | — | 41 | 45 | 180°F. |

EVA-1: Ethylene-vinyl acetate copolymer, vinyl acetate content 32–34 wt. %; melt index 22–28; R & B softening point 240°F.

EVA-2: Ethylene-vinyl acetate copolymer, vinyl acetate content 17–19 wt. %; melt index 2.1–2.9; R & B softening point 390°F.

The control blend and blends 2 and 6 were sprayed onto nonwoven polypropylene fiber at a rate of about 0.5 gallon per square yard and the resulting laminates were tested under a fluid pressure of 30 psi at 150° F. Blends 2 and 6, which are representative of the instant invention, were substantially impervious to fluid loss after three days, whereas the unmodified asphalt of the control run broke down after less than 20 minutes.

The above data demonstrate that the penetration and softening point of asphaltic materials are significantly modified by the addition thereto of minor amounts of copolymers of ethylene-vinyl acetate. The data further show that the incorporation of a mixture of ethylene-vinyl acetate copolymers significantly improves the penetration but affords a lesser increase in the softening point, thereby contributing to the flexibility characteristics of the product. The data further show that asphalts modified according to the invention are effective sealant materials for pond liners.

Reasonable variation and modification are possible within the scope of the foregoing disclosure and the appended claims.

What is claimed is:

1. A coating composition consisting essentially of 95 weight percent of an oxidized asphalt having a penetration at 77° F., after oxidation, of about 35 and a ring and ball softening point, after oxidation, of about 165° F. and about 5 weight percent of an ethylene-vinyl acetate copolymer having a vinyl acetate content in the range of 17 to 19 weight percent, a melt index in the range of 2.1 to 2.9, and a ring and ball softening point of about 390° F.

2. A composition consisting essentially of about 90 weight percent of an oxidized asphalt having a penetration, after oxidation, of about 35 and a ring and ball softening point, after oxidation, of about 165° F. and a mixture of about 5 weight percent of an ethylene-vinyl acetate copolymer having a vinyl acetate content in the range of 32 to 34 weight percent, a melt index in the range of 22 to 28, and a ring and ball softening point of about 240° F., and about 5 weight percent of a second ethylene-vinyl acetate copolymer having a vinyl acetate content in the range of 17 to 19 weight percent, a melt index in the range of 2.1 to 2.9, and a ring and ball softening point of about 390° F.

3. A laminate system comprising a polyolefin fabric layer impregnated with a modified asphalt composition consisting essentially of 95 weight percent of an oxidized asphalt having a penetration at 77° F., after oxidation, of about 35 and a ring and ball softening point, after oxidation, of about 165° F. and about 5 weight percent of an ethylene-vinyl acetate copolymer having a vinyl acetate content in the range of 17 to 19 weight percent, a melt index in the range of 2.1 to 2.9, and a ring and ball softening point of about 390° F.

4. A laminate system comprising a polyolefin fabric layer impregnated with a modified asphalt composition consisting essentially of about 90 weight percent of an oxidized asphalt having a penetration, after oxidation, of about 35 and a ring and ball softening point, after oxidation, of about 165° F. and a mixture of about 5 weight percent of an ethylene-vinyl acetate copolymer having a vinyl acetate content in the range of 32 to 34 weight percent, a melt index in the range of 22 to 28, and a ring and ball softening point of about 240° F., and about 5 weight percent of a second ethylene-vinyl acetate copolymer having a vinyl acetate content in the range of 17 to 19 weight percent, a melt index in the range of 2.1 to 2.9, and a ring and ball softening point of about 390° F.

5. A laminate system according to claim 4 wherein said asphalt composition has incorporated therein from 0.5 to about 10 weight percent, based on weight of asphalt-copolymer blend, of asbestos.

6. A laminate system according to claim 4 wherein said modified asphalt composition has incorporated therein from about 2.5 to about 5 weight percent, based on weight of asphalt-copolymer blend, of asbestos.

7. A laminate system according to claim 4 wherein said polyolefin fabric is impregnated with 0.5 gallon of said modified asphalt composition per yard of fabric.

* * * * *